United States Patent Office 3,398,202
Patented Aug. 20, 1968

3,398,202
PROCESS FOR TREATING A MIXTURE OF SYMMETRIC AND ASYMMETRIC DICHLOROTETRAFLUOROETHANES
Louis Foulletier, Lyon, France, assignor to Ugine Kuhlmann, Paris, France, a corporation of France
No Drawing. Filed Aug. 8, 1966, Ser. No. 570,686
Claims priority, application France, Aug. 13, 1965, 28,291
5 Claims. (Cl. 260—653)

ABSTRACT OF THE DISCLOSURE

A process for increasing the proportion of symmetric dichlorotetrafluorethane by passing a mixture of symmetric and asymmetric dichlorotetrafluorethane over a catalyst maintained between 50 and 500° C.

---

It is well-known that the processes for the preparation of dichlorotetrafluorethane, in particular by substituting fluorine for chlorine in hexachloroethane, lead to a mixture of both isomers, one symmetric, 1,2 dichlorotetrafluorethane, the other asymmetric, 1,1 dichlorotetrafluorethane.

It is also well-known that the chemical stability of the asymmetric isomer at room temperature, at which temperature it is most generally utilized, is definitely lower than that of the symmetric isomer, particularly towards hydrolysis.

Therefore, it is necessary to find a product wherein the percentage of asymmetric isomer is low or even null.

It is practically impossible to utilize physical processes, such as distillation or selective adsorption to partly or totally eliminate the asymmetric isomer from the mixtures resulting from the preparation processes because the physical properties of both isomers are very near one another.

It is known that the asymmetric isomer is thermodynamically the more stable of the two and that the compounds of the same family, such as trichlorotrifluorethane or tetrachlorodifluorethane, are isomerized or subjected to dismutation thereby giving less symmetric product. Thus, in the case of trichlorotrifluorethane, the isomerization is realized according to the reaction:

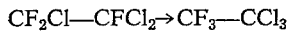

and the dismutation according to the reaction:

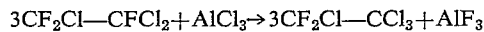

As a consequence, it was logical to believe that the isomerization of a mixture of both symmetric and asymmetric dichlorotetrafluorethanes would lead to a greater proportion of asymmetric isomer.

I have made the discovery that, contrarily to what was to be expected, it is possible, by the chemical process of isomerization or dismutation, to increase the proportion of symmetric isomer. It is thought that this phenomenon is due to the fact that the speed at which the asymmetric isomer under the effect of the dismutation transforms into trichlorotrifluorethane and chloropentafluorethane was higher than the isomerization speed of the symmetric isomer into asymmetric isomer. Likewise, the reaction of dichlorotetrafluorethane with hydrofluoric acid permits a decrease in the amount of asymmetric isomer because the transformation of asymmetric isomer into chloropentafluorethane is higher than that of the symmetric isomer.

My invention consists in feeding a mixture of symmetric and asymmetric dichlorotetrafluorethanes, as vapour or liquid, on a catalyst maintained at a temperature between 50 and 500° C.

Numerous substances may be used as catalysts in the reaction, for example: activated carbon, activated alumina, molecular sieves (in the absence of hydrofluoric acid), aluminum fluoride, or chromium, cobalt, aluminum, copper, iron or molybdenum salts. The salts used as catalysts may be deposited on a support.

When the reaction product is in the vapour state, the space speed utilized may vary between 5 and 500 litres per hour and per litre of catalyst.

The reaction may be carried out in the presence of hydrofluoric acid in which case the life of the catalyst is increased and a greater quantity of chloropentafluorethane is obtained. This latter is recovered and is used in the refrigerating industry or as raw material in the production of the hexafluorethane used as dielectric. The molar ratio, HF/dichlorotetrafluorethane, may vary from about 0 to 1, according to the amount of chloropentafluorethane desired.

It is also possible to increase the life of the catalyst by working in the presence of free chlorine.

The following examples are given to illustrate the invention.

EXAMPLE 1

In a stainless steel autoclave the following were placed: 185 g. of a mixture of dichlorotetrafluorethanes, 18.5 g. of anhydrous aluminum chloride, 1.2 cm.³ water.

The autoclave was heated to 140° C. The feed mixture contained 55% symmetric isomer. After 24 hours' treatment, the percentage of said isomer reached 67% and, after 48 hours, 69.5%.

EXAMPLE 2

50 cm.³ of activated carbon were placed in a reactor formed of a nickel tube of 25 mm. in diameter. Said carbon was degassed for 3 hours at 400° C. under a nitrogen flow. While the reactor was maintained at 400° C., a mixture of dichlorotetrafluorethanes containing 92% symmetric isomer was fed in. The space speed was 67 l./h./l. (litres of initial gas per hour and per litre of catalyst). The collected product contained chloropentafluorethane and trichlorotrifluorethane beside dichlorotetrafluorethanes. The mixture of dichlorotetrafluorethanes collected, and separated, contained 98% symmetric isomer.

EXAMPLE 3

In an operation similar to that of Example 2, but wherein activated carbon was replaced by a catalyst comprising lithium fluoride deposited on activated carbon and at a space speed of 56 l./h./l. at 450° C., the percentage of symmetric isomer was raised from 84% to 90%.

EXAMPLE 4

The operation was carried out as in Example 2, but at 450° C. with a space speed of 28 l./h./l., and with alumina calcined at 900° C. The percentage of symmetric isomer was raised from 53% to 59.7%

EXAMPLE 5

The operation was carried out as in Example 2, but with activated carbon impregnated with ferric sulphate as a catalyst, and at 450° C. with a space speed of 55 l./h./l. The percentage of symmetric isomer was brought from 83% to 86.2% with an output of 91.7% in chlorofluorocarbons (number of moles of chlorofluorocarbons per 100 moles of dichlorotetrafluorocarbons used).

EXAMPLE 6

The reactor was filled with 50 cm.³ of a catalyst formed of activated carbon in 1 mm. grains, impregnated with a chromium salt. A mixture of hydrofluoric acid and dichlorotetrafluorethanes, with a molar ratio of 0.29 to 1 and heated to 350° C. was fed into this reactor. The initial mixture of dichlorotetrafluorethanes contained 80.5% of symmetric isomer, the mixture obtained after reaction contained 89.2%. About 20% of the initial dichlorotetrafluorethanes were transformed into chloropentafluorethane.

EXAMPLES 7 TO 11

These operations were carried out as in Example 5, but with different catalysts. The following table shows the results.

| Ex. No. | Catalyst | Temp. in ° C. | Space speed in l./h./l. | Molar ratio $HF/C_2F_4Cl_2$ | Percentage of symmetric isomer | | Output in chlorofluorocarbons |
|---|---|---|---|---|---|---|---|
| | | | | | In initial product | In refined product | |
| 7 | Activated carbon impregnated with cobalt salt. | 500 | 68 | 0.62 | 52.8 | 59.1 | +100 |
| 8 | Activated carbon and $NH_4$ molybdate | 400 | 82 | 0.29 | 79.8 | 83.5 | 99 |
| 9 | Activated carbon and Cr and Al salts | 350 | 89.5 | 0.41 | 79.5 | 89.1 | 89 |
| 10 | $(SO_4)_3 Cr_2$ without support | 400 | 72 | 0.56 | 80.4 | 81.1 | 97 |
| 11 | Activated carbon impregnated with Cr salt. | 350 | 127 | 0.56 | 80.9 | 91.1 | 96 |

EXAMPLE 12

A mixture of 300 kg./h. dichlorotetrafluorethanes, 8.4 kg./h. HF, and 0.4 kg./h. chlorine was fed into a reactor containing 500 litres of activated carbon impregnated with chromium salts. Before its introduction into the reactor, the mixture of dichlorotetrafluorethanes was preheated to 350° C.

By feeding the reactor with a mixture containing 84% of symmetric isomer, a dichlorotetrafluorethane mixture containing 91% of symmetric isomer was obtained. The reaction product contained about 2% trichlorotrifluorethane and 11% chloropentafluorethane. The output was practically quantitative. After 200 hours of operation the efficiency was practically the same.

In the same way a product containing 95% of symmetric isomer was obtained from a product containing 88% of the same isomer.

While I have described certain presently preferred embodiments of my invention, it is to be understood that it may be embodied within the scope of the appended claims.

I claim:
1. A process for treating a mixture of symmetric and asymmetric dichlorotetrafluorethane to reduce the proportion of asymmetric dichlorotetrafluorethane present in the mixture comprising passing the mixture over a catalyst selected from the group consisting of activated carbon, activated alumina, molecular sieves, aluminum fluoride, chromium sulphate, aluminum chloride, ferric sulphate and ammonium molybdate, said catalyst being maintained at a temperature of between 50 and 500° C.
2. A process as set forth in claim 1 wherein said metallic salt is deposited on a support.
3. A process as set forth in claim 1 wherein the reaction is carried out in the presence of hydrofluoric acid.
4. A process as set forth in claim 1 wherein the reaction is carried out in the presence of chlorine.
5. A process as set forth in claim 1 wherein the reaction is carried out in the presence of lithium fluoride.

References Cited

UNITED STATES PATENTS 3,087,976   4/1963   Hauptschein et al. ___ 260—653

DANIEL D. HORWITZ, *Primary Examiner.*